United States Patent [19]

Matsumoto et al.

[11] Patent Number: 4,938,093
[45] Date of Patent: Jul. 3, 1990

[54] TILT STEERING COLUMN UNIT FOR VEHICLES WITH MEMORY MECHANISM

[75] Inventors: Sakae Matsumoto, Takasaki; Takeshi Fujiwara, Maebashi, both of Japan

[73] Assignee: Nippon Seiko Kabushiki Kaisha, Tokyo, Japan

[21] Appl. No.: 321,373

[22] Filed: Mar. 10, 1989

[51] Int. Cl.$^5$ .............................................. B62D 1/18
[52] U.S. Cl. ......................................... 74/493; 74/540
[58] Field of Search .................... 74/493, 540; 280/775

[56] References Cited

U.S. PATENT DOCUMENTS 4,594,909 6/1986 Yamaguchi ............................ 74/493
4,750,379 6/1988 Nishikawa et al. .................... 74/493

FOREIGN PATENT DOCUMENTS 57-147957 9/1982 Japan ..................................... 74/493
62-103257 5/1987 Japan .

Primary Examiner—James R. Brittain
Attorney, Agent, or Firm—Shapiro and Shapiro

[57] ABSTRACT

A tilt steering column with memory mechanism for vehicles comprises a first member fixed to a supporting member and having a first gear portion, a second member having one end pivotally connected to a pivot shaft fixed to the fixed member and another end provided with second gear portion engageable with the first gear portion of the first member, third member mounted on the fixed member for movement in a predetermined direction and having a third gear portion engageable with the first gear portion of the first member, a control arrangement for preventing the second gear portion of the second member from engaging the first gear portion of the first member when the supporting member is lifted upwardly, and for permitting the engagement between the first and second gear portions when the supporting member is pushed down, and a shift preventing arrangement for preventing the third member from shifting beyond a certain limit relative to the second member.

10 Claims, 6 Drawing Sheets

TILT STEERING COLUMN UNIT FOR VEHICLES WITH MEMORY MECHANISM

BACKGROUND OF THE INVENTION

1. Field of the Invention

The present invention relates to an improvement in a tilt steering column unit for vehicles with a memory mechanism. More particularly, it relates to a tilt steering column unit wherein a supporting portion for rotatably supporting a steering shaft is tiltable around tilt pins with respect to a fixed portion fixed to a vehicle body and which incorporates a memory mechanism for storing a position of the supporting portion before it is tilted up.

2. Related Background Art

In the past, while various tilt steering apparatuses have been proposed, and each has had advantages and disadvantages. In order to eliminate the disadvantages of the conventional tilt steering apparatuses, the Applicant proposed an improved technique as disclosed in the Japanese Patent Laid-Open No. 62-103257. According to such technique, an engagement system rather than a fastening system is adopted to connect the supporting portion to the fixed portion, thereby holding a steering wheel positively, and the rigidity of the steering wheel is increased by selecting the position of an engaging system.

However, it was found that there was room for further improvement in the memory mechanism of such tilt steering apparatus.

That is to say, in the tilt steering apparatus disclosed in the above-mentioned Japanese Patent Laid-Open No. 62-103257, a fixed gear member is attached to the supporting portion, whereas a memory member and a movable member are attached to the fixed portion, whereby the returning position of the supporting portion from tilted up position is determined by the engagement between the fixed gear member and the movable gear member, and the set tilt position is stored or memorized by the engagement between the fixed gear member and memory member. When tilted up, the movable gear member is released from the fixed gear member through the medium of an operating lever, and the alteration of the memory position is effected by a select lever.

In this case, since the memory position is memorized or stored in a condition that a portion (pin) of the memory member is engaged by a portion (recess) of the movable gear member, one must pay attention to the positional accuracy of the engagement portion between teeth of the movable gear member and the memory member. However, since it was very difficult to obtain such positional accuracy, thus leaving slight play between the teeth of these members, a good operating feel could not often be obtained. Further, it was difficult to form the proper engagement portion. In addition, if the operating lever is actuated by mistake while the steering wheel is being lifted, there would arise discrepancy in the positions of the memory member and movable gear member, thus making tilt-lock impossible and also making restoration of the members to their normal original positions impossible or difficult.

SUMMARY OF THE INVENTION

Accordingly, an object of the present invention is to provide an improved tilt steering column unit for vehicles with a memory mechanism which can avoid the shortcomings of the tilt steering apparatus with memory described in the above-mentioned Japanese Patent Laid-Open No. 62-103257. More particularly, an object of the present invention is to provide a tilt steering column unit wherein the memory member can be easily manufactured and the accuracy of the memory position can be easily determined.

Another object of the present invention is to provide an improved tilt steering column unit which avoids positional discrepancy between a memory member and a movable gear member even if a select lever is actuated by mistake.

According to the present invention, when a supporting member is shifted upwardly in order that a driver may exit the vehicle, by an action of control means (25d, 46c) arranged between a first member and a third member, a third gear of the third member is prevented from engaging a first gear of the first member, so as not to hinder the supporting member from lifting or flipping up. Further, the control means permits the first gear of the first member to be engaged by the third gear of the third member when the supporting member is pushed down after the driver enters the vehicle. The control means can be manufactured easier than the conventional ones and has adequate rigidity.

Further, according to the present invention, even if a steering wheel is pushed down after memory means are released by mistake while the supporting member is flipped or sprung up, because of the action of a shift preventing means, the third member is prevented from shifting beyond a certain limit relative to a second member, so as not to hinder the engagement between the first member and the second member. The shift preventing means of this kind are not known in the art.

DETAILED DESCRIPTION OF THE PREFERRED EMBODIMENTS

The present invention will now be explained in connection with embodiments thereof with reference to the accompanying drawings. However, it should be noted that the present invention is not limited to these embodiments and can be modified without the departure from the scope or gist of the invention.

Figure 1:
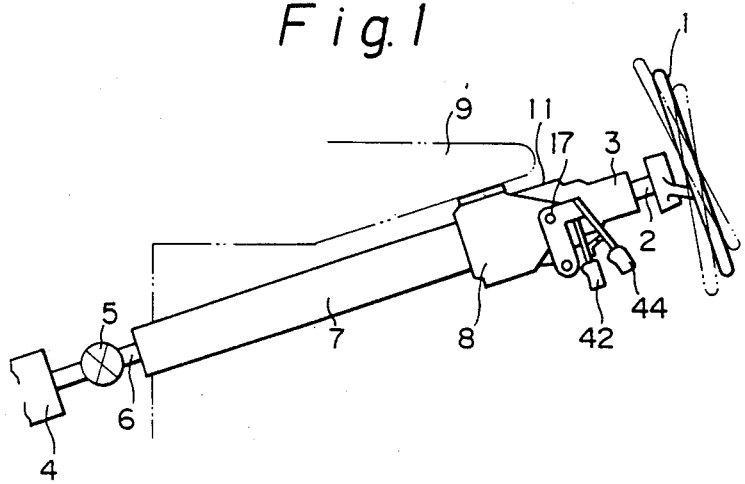
FIG. 1 is a perspective view of a tilt steering column unit according to a first embodiment of the present invention.

FIG. 1 shows a tilt steering column unit according to a first embodiment of the present invention. In FIG. 1, an upper steering shaft 2 on which a steering wheel 1 is fixedly mounted is rotatably supported by an upper column 3 through the medium of a ball bearings 1a (FIG. 2), whereas a lower steering shaft 6 connected to a steering gear 4 through a universal joint 5 is rotatably supported by a lower column 7. The lower column 7 is fixed to an instrument panel 9 of a vehicle through a bracket 8 attached to an upper portion of the column 7. The upper and lower steering shafts 2 and 6 are rotatably and tiltably interconnected through a universal joint 10 (FIG. 2).

Figure 2:
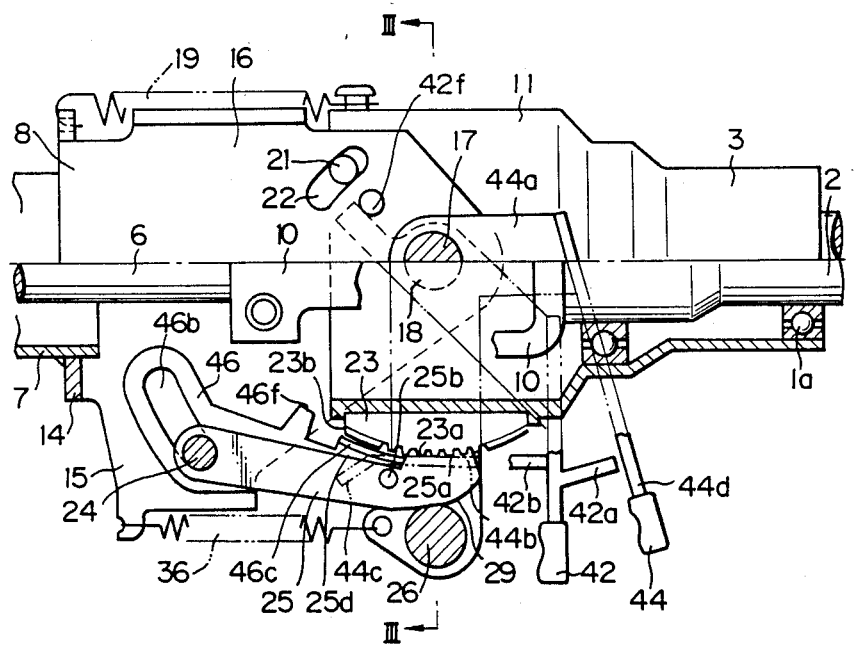
FIG. 2 is a side view, partially in section, of a main portion of the tilt steering column unit of FIG. 1.
Figure 3:
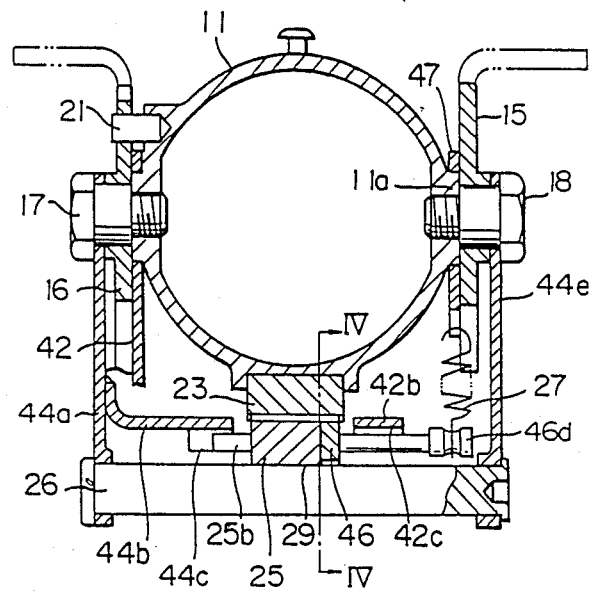
FIG. 3 is a sectional view taken along the line III—III of FIG. 2.

The upper column 3 is provided at its lower end with a cylindrical portion 11 which is connected to the bracket 8 more particularly as seen in FIG. 2 which is an enlarged side view, partially in section, of a main portion of the tilt steering column unit of FIG. 1, the bracket 8 has a base 14 and a pair of left and right bent portions 15 and 16 which extend from both ends of the base 14 in parallel to each other, and the cylindrical portion 11 of the upper column 3 extends between and contacts with the bent portions 15 and 16 (FIG. 3). The cylindrical portion 11 and accordingly the upper column 3 is connected to the bracket 8 by means of a pair of tilt pins 17 and 18 extending perpendicularly to the bent portions 15, 16 and passing through a center of the universal joint 10, so that the upper column 3 is tiltable around axes of the tilt pins.

A flip-up or spring-up spring 19 is tensioned between the bracket 8 and the cylindrical portion 11 to normally bias the upper column 3 upwardly toward an inclined position. A stopper pin 21 fixedly mounted on the cylindrical portion 11 is received in an elongated stroke regulating slot 22 formed in the left bent portion 15 to regulate a range of the inclination of the upper column 3. At an intermediate position between the opposed tilt pins 17 and 18 and below them, the cylindrical portion 11 is provided at its undersurface with a gear member 23 fixed thereto. The gear member 23 has a plurality of gear teeth 23a formed on a semi-cylindrical surface thereof having a curvature corresponding to a circle a center of which coincides with the axes of the tilt pins 17, 18.

A movable gear member 25 is pivotally mounted on a support shaft 24 fixed to and extending between the bent portions 15 and 16 of the bracket 8. The movable gear member 25 is provided at its free end with teeth 25a which can mesh with the teeth 23a of the gear member 23. That is to say, the movable gear member 25 has the gear portion 25a opposed to the gear member 23 and can mesh with the gear portion 23a of the gear member 23 within a predetermined angular range. By altering an engagement or meshed position between the gear portions 25a and 23a, it is possible to rock the upper column 3 and accordingly the steering shaft 2 around the tilt pins 17, 18 and to adjust an angle of inclination (tilt) of the steering shaft 2. The movable gear member 25 has a guide pin 25b cooperating with guide portions 44b and 44c of a flip-up or lifting lever 44 (described later) to guide the movable gear member 25 during the rocking movement thereof around the support shaft 24, and a circular hole 25c through which the support shaft 24 extends.

Next, a lifting mechanism for controlling the rocking movement of the movable gear member 25 (and, thus, the engagement between the gear portion 23a of the gear member 23 and the gear portion 25a of the movable gear member 25) and for flipping up the steering shaft 2 and the upper column 3 supporting the steering shaft will be explained.

The lifting mechanism comprises the aforementioned lifting lever 44 for releasing the engagement between the movable gear member 25 and the gear member 23, and the aforementioned flip-up spring 19 for applying a biasing force to flip up the steering shaft 2 and the upper column 3 after the engagement between the movable gear member 25 and the gear member 23 is released.

The lifting lever 44 is rotatably supported by the bent portions 15 and 16 through the tilt pins 17 and 18. More particularly, the lifting lever 44 has L-shaped lever arms 44a and 44e extending axially of the steering shaft 2, which lever arms are pivotally connected, at their bent areas, to the respective tilt pins 17 and 18 and also are connected, at their inner ends, to an operating arm portion 44d to be rotated altogether around the tilt pins 17, 18. Lower legs of the lever arms 44a, 44e extend perpendicularly to an axis of the steering shaft 2 and are interconnected at their lower ends by means of a support shaft 26. That is to say, the support shaft 26 is received in holes formed in the lever arms 44a, 44e and is fixed to the lever arms by caulking the ends of the support shaft. Further, a tapered back surface 29 of the movable gear member 25 is abutted against the support shaft 26.

Coil springs 36 are tensioned between the lower ends of the lever arms 44a, 44e and the bent portions 15, 16 of the bracket 8 to bias the lifting lever 44 in a clockwise direction (FIG. 2). The guide portion 44b formed on an inner surface of the lever arm 44a extends above the guide pin 25b of the movable gear member 25. The guide portion 44c is bent downwardly from the left (FIG. 2) end of the guide portion 44b to provide a guide surface for guiding the guide pin 25 downwardly. Accordingly, when a driver grips a free end of the lifting lever 44 and rotates the same in a counterclockwise direction (FIG. 2) against the force of the coil springs 36, the guide portions 44b and 44c push down the guide pin 25b, with the result that the movable gear member 25 is rocked downwardly around the support shaft 24, thus releasing the engagement between the gear member 23 and the gear portion 25a of the movable gear member 25.

Figure 4:
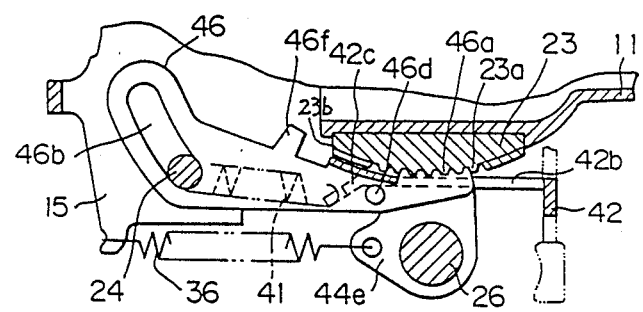
FIG. 4 is a sectional view taken along the line IV—IV of FIG. 3.
Figure 5:
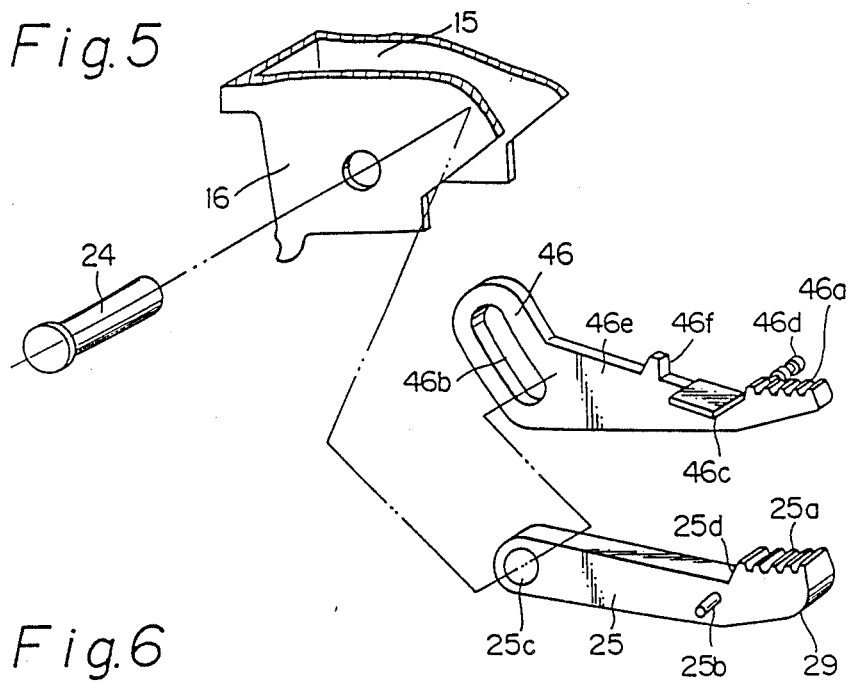
FIG. 5 is an exploded perspective view showing an attachment relation between a movable gear member and a memory member of the tilt steering column unit.

Next, a memory mechanism for positioning the upper steering shaft 2 at a predetermined inclination (tilt) angular position will be explained with reference to FIGS. 3 to 5.

The memory mechanism comprises a memory member 46 for permitting the engagement between the movable gear member 25 and the gear member 23 only at a predetermined position, and a select lever 42 for controlling the memory member.

The memory member 46 is arranged in parallel with the movable gear member 25 and has a body 46e, a gear portion 46a (FIG. 5) extending from the body 46e to mesh with the teeth 23a of the gear member 23 fixed to the cylindrical portion 11 of the upper column 3, a guide pin 46d extending from the body near the gear portion 46a in a direction opposite to the guide pin 25b of the movable gear member 25, a memory plate 46c extending from the body near the root of the gear portion 46a adjacent to the gear member 23 and insertable into a notch 25d of the movable gear member 25, a stopper portion 46f projecting upwardly from the body to prevent the positional discrepancy (described later), and an elongated slot 46b for receiving the support shaft 24.

The elongated slot 46b has a length and a configuration so selected that when the steering shaft 2 is in the lifted position, the support shaft 24 is positioned at an uppermost end of the slot 46b, and so that when the steering shaft 2 is in the lowermost position the support shaft 24 is positioned at a lowermost end of the slot. A coil spring 27 (FIG. 3) is connected, at its one end, to a free end of the guide pin 46d of the memory member 46 and is also connected, at its other end, to a plate 47 which is movably mounted on a projection 11a of the cylindrical portion 11 associated with the tilt pin 18. Since the coil spring 27 always biases the memory member 46 upwardly (FIG. 3), when the steering wheel 1 is flipped up, the memory member 46 is shifted together with the upper column 3 while engaging the gear portion 46a with the gear member 23.

Therefore, when the steering wheel 1 is flipped up, the memory plate 46c engages with the gear portion 25a, thus preventing the rocking movement of the movable gear member 25 biased by the coil springs 36 through the support shaft 26. On the other hand, when the edge of the memory plate 46c coincides with the notch 25d formed on the root of the gear portion 25a of the movable gear member 25, the movable gear member 25 can be further rocked to engage with the gear member 23. Thus, there is provided a memory mechanism wherein the upper column 3 is fixed at the time when the movable gear member 25 and the memory member 46 have reached the same positional level.

As shown in FIG. 3, the select lever 42 for controlling the memory member 46 is rotatably supported by the tilt pin 17 and extends downwardly therefrom to form an operating portion, and has a projection 42a for rotating the lifting lever 44 by pushing the same when the select lever is rotated in a counterclockwise direction (FIG. 2), a flat guide surface 42b extending above the guide pin 46d, and a guide surface 42c (FIG. 4) bent downwardly from the end of the flat guide surface 42b to guide the guide pin 46d downwardly. A coil spring 41 (FIG. 4) is tensioned between a free end of the guide surface 42c and the support shaft 24 to always bias the select lever 44 in a clockwise direction. The clockwise rotation of the select lever 42 is regulated by a stopper 42f (FIG. 2). When the select lever is rotated in a counterclockwise direction against the action of the coil spring 41, the lifting lever 44 is also rocked in a counterclockwise direction together with the select lever 42 through the projection 42a, with the result that the guide pin 46d is guided along the guide surfaces 42b and 42c to move the memory member 46 downwardly, thus releasing the engagement between the gear portion 23a of the gear member 23 and the gear portion 46a and shifting the movable gear member 25 downwardly as mentioned above.

Next, an operation of the tilt steering column unit constructed as above will be explained.

FIG. 2 shows a condition that the upper column 3 is held at a predetermined memory position with respect to the bracket 8. When the driver desires to flip up or lift the steering wheel 1 in order that he may exit the vehicle, he pulls up the lifting lever 44 in a counterclockwise direction against the action of the coil springs 36. Consequently, the support shaft 26 is simultaneously rocked in a counterclockwise direction, thereby releasing the supporting condition regarding the back surface 29 of the movable gear member 25. As a result, the movable gear member 25 is moved downwardly while the guide pin 25b thereof is being guided along the guide portions 44b and 44c, thereby shifting the movable gear member 25 from the engagement condition (with the gear member 23) to the released condition.

Figure 6:
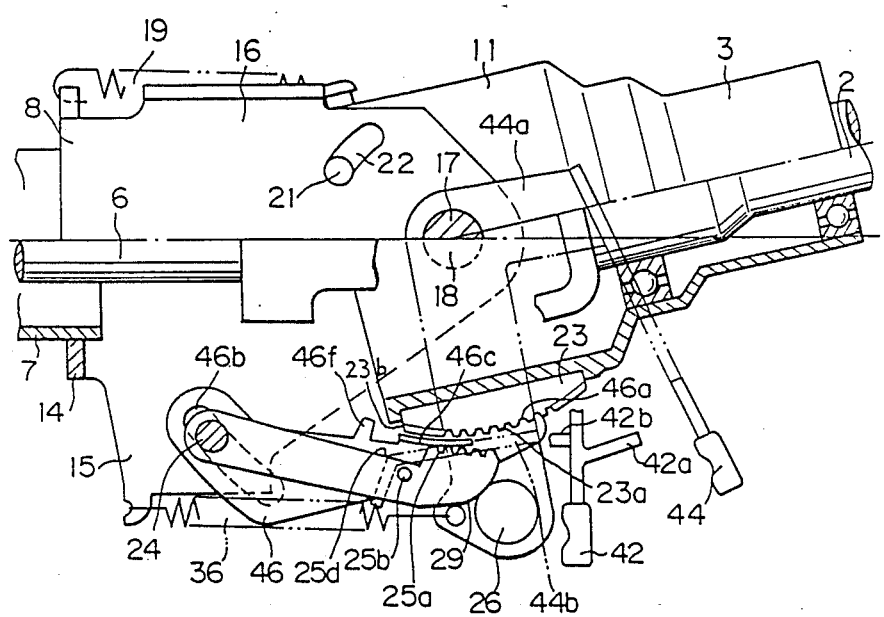
FIG. 6 is a side view, partially in section, of the main portion of the tilt steering column unit showing a condition that a steering handle is lifted by actuating a lifting lever.

When the gear member 23 is released from the movable gear member 25, the upper column 3 is pulled upwardly by the action of the flip-up spring 19 to a lifted position (a position 25 shown in FIG. 6) in which the steering wheel 1 is positioned shown by a two-dot broken line in FIG. 1) where the stopper pin 21 is abutted against the lowermost end of the elongated stroke regulating slot 22. In this case, the gear portion 25a of the movable gear member 25 engages with the surface of the memory plate 46c of the memory member 46, thus preventing the engagement between the gear portions 23a and 25a. However, the gear portion 46a of the memory member 46 is maintained to be meshed with the gear portion 23a of the gear member 23, the memory member 46 is also lifted together with the upper column 3.

In order to return the steering wheel 1 to a memory position (FIG. 2) where the steering wheel is not lifted, the driver may merely push down the steering wheel 1 against the action of the flip-up spring 19. As a result, the gear portion 25a of the movable gear member 25 moves on the surface of the memory plate 46c of the memory member 46. When the gear portion 25a passes the end of the memory plate to engage the memory plate with the notch 25d of the movable gear member 25, the movable gear member 25 is rocked toward the gear member 23 (in a counterclockwise direction in FIG. 6), thus engaging the gear portion 25a with the gear portion 23a of the gear member 23. In this case, the support shaft 26 is rocked together with the lifting lever 44 in a clockwise direction to slip under the back surface 29 of the movable member 25, thereby keeping the engagement between the gear members 23 and 25.

When it is desired to change or alter the memory position, the driver may rotate the select lever 42 in a counterclockwise direction (FIG. 2). As a result, the projection 42a of the select lever 42 abuts against the lifting lever 44 so that the both levers are rotated altogether in a counterclockwise direction. As the select lever 42 is rotated in a counterclockwise direction, the guide surfaces 42b and 42c thereof are also shifted to push down the guide pin 46d of the memory member 46 obliquely. Consequently, the memory member 46 is disengaged from the gear member 23. Further, since the lifting lever is rotated together with the select lever 42, the movable gear member 25 is rocked in a clockwise direction through the engagment between the guide portions 44b, 44c and the guide pin 25b, thus disengaging the gear portion 25a from the gear member 23, and the end of the memory plate 46c engages into the notch 25d of the movable member 25.

In this condition, the driver adjusts the upper steering shaft 2 to a desired tilt angle of the steering wheel. After such adjustment, when he leaves his hand from the select lever 42, the levers 42 and 44 are rotated in a clockwise direction, thus engaging both of the movable gear member 25 and memory member 46 with the gear member 23, whereby a new desired tilt angle setting position is obtained. This new position can be restored in the same manner as that described above, even after the steering wheel is if flipped up.

In the condition that the steering wheel 1 is in the lifted position, if the select lever 42 is rotated in a counterclockwise direction by mistake, the guide surfaces 42b and 42c are also shifted and the guide pin 46d of the memory member 46 is also pushed down by the guide surfaces 42b, 42c obliquely, thus disengaging the memory member 46 from the gear member 23. In this condition, as the steering wheel 1 is pushed down, since the memory plate 46c rests on the movable gear portion 25a, the memory member 46 is not restrained in the moving direction, and the memory member 46 can move freely. However, the positional relation between the gear portion 46a of the memory member 46 and the gear portion of the movable gear member 25 is not lost out of the tilt adjustable range, because the memory member 46 has the stopper portion 46f.

That is to say, the stopper portion 46f acts so that, even if the erroneous operation as mentioned above is carried out, as the steering wheel 1 is pushed down to the lowermost tilt adjusable position, an end 23b of the gear member 23 abuts against the stopper portion 46f, and the end of the memory plate 46c engages into the notch 25d of the movable gear member 25, thus returning the memory member 46 to the engagement condition at the lowermost tilt adjustable position.

On the other hand, in the conventional tilt steering apparatus, since there was no provision of a member corresponding to the stopper portion 46f, there arose the positional discrepancy between the memory member 46 and the movable gear member 25, and if such positional discrepancy would exceed the lowermost tilt adjustable position, the gear portion 25a of the movable gear member 25 could not mesh with the gear portion 23a of the gear member 23, since a portion of the memory member was positioned between the gear members.

In the first embodiment, since the engagement portions between the gear portions 23a, 25a and 46a are positioned at the intermediate point between the left and right tilt pins 17 and 18 and below them, the both tilt pins 17, 18 are subjected to force uniformly, thus increasing the supporting rigidity of the steering wheel. That is to say, the steering wheel 1 is not vibrated even during an idling condition of the vehicle and/or a running condition at a high speed, thus giving the rigid feeling of the steering wheel to the driver.

Further, as shown in FIG. 2, when the whole upper column 3 is formed in a cylindrical shape at not only the lower cylindrical portion 11 but also an upper portion of the column, the rigidity of the column will be further increased and the column will be more compact and lightweight, in comparison with the conventional column structure in which the upper column is attached to the side plates of the bracket. In addition, the length of the column can be shorter and/or the range of the inclination (tilt) of the column can be wider.

Furthermore, it was found that the inherent frequency was not decreased due to the use of the tilt mechanism even when the memory mechanism capable of operating positively with a simple construction was incorporated into the tiltable steering apparatus.

Lastly, another embodiment of the present invention will be explained with reference to FIGS. 7 to 9. This embodiment provides an improvement over the arrangement of the stopper portion 46f of the memory member 46. More particularly, in the first embodiment, when the steering wheel 1 was returned to the lowermost tilt adjustable position, the end 23b of the gear member 23 abutted against the stopper portion 46f of the memory member 46, thus returning the memory member 46 to the lowermost tilt adjustable position However, in this case, since the stopper portion 46f is formed on the memory member 46, the configuration of the memory member is somewhat complex, and the manufacture of the memory member may be rather difficult. Also the rigidity for the support would be reduced in comparison with the present embodiment.

Figure 7:
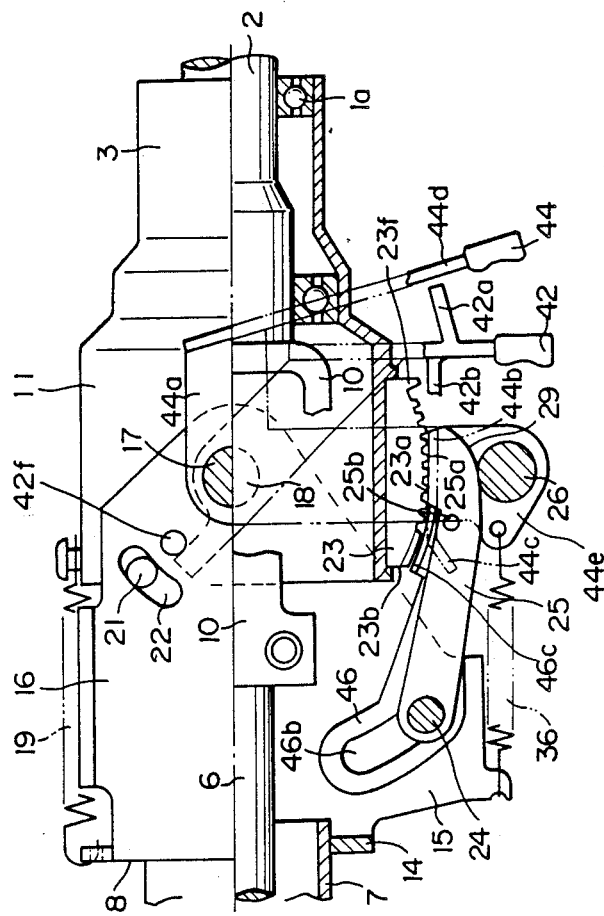
FIG. 7 is a side view, partially in section, of a main portion of a tilt steering column unit according to a second embodiment of the present invention.
Figure 8:
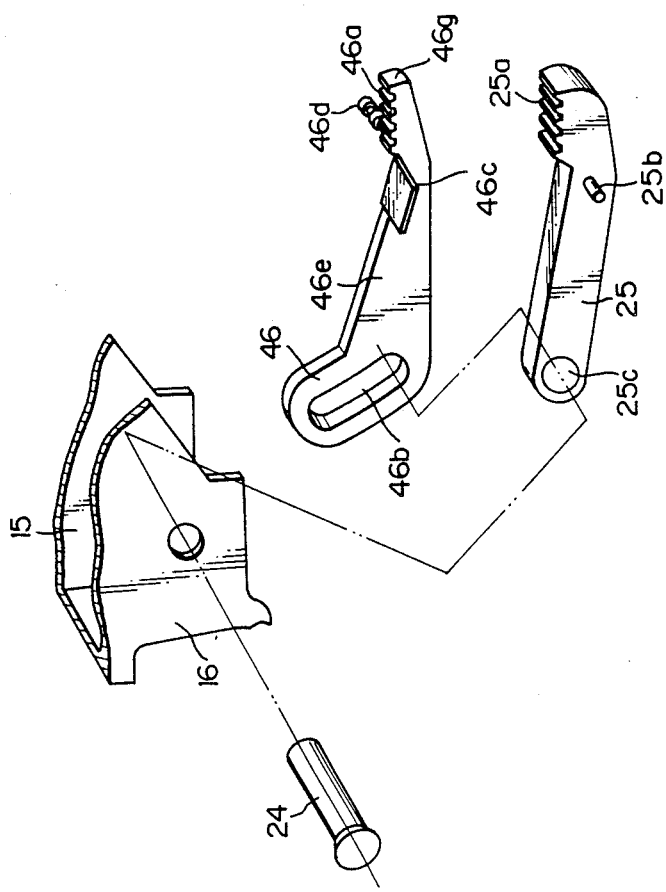
FIG. 8 is an exploded perspective view showing an attachment relation between a movable gear member and a memory member of the tilt steering column unit of FIG. 7.
Figure 9:
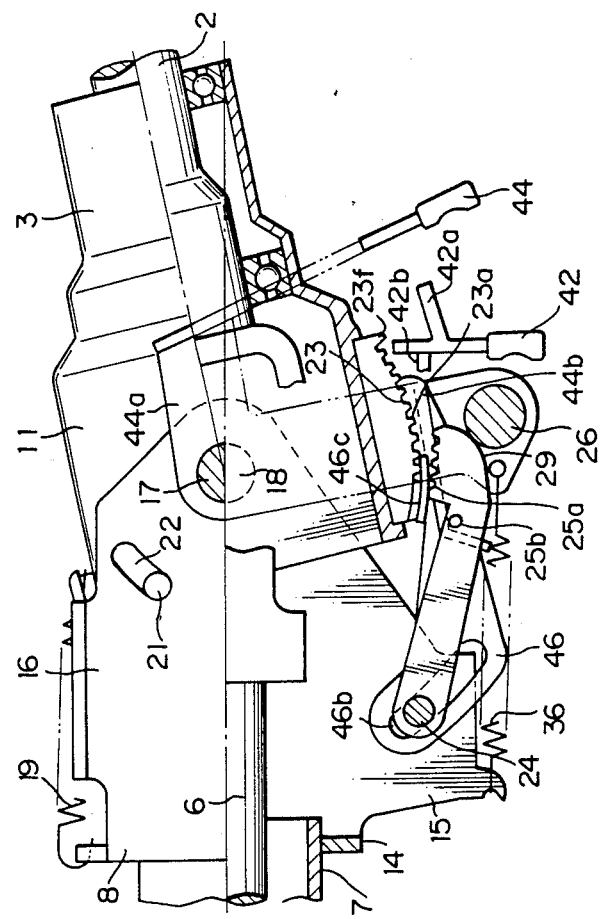
FIG. 9 is a side view, partially in section, of the main portion of the tilt steering column unit of FIG. 7 showing a condition that a steering handle is lifted by actuating a lifting lever.

On the other hand, according to the present embodiment shown in FIGS. 7 to 9, in place of the stopper portion 46f formed on the memory member 46, a projection 23f is formed on the gear member 23 at one end of the gear portion 23a thereof (opposite to the end 23b). With this arrangement, when the steering wheel 1 is pushed down to the lowermost tilt adjustable position, an end 46g (FIG. 8) of the memory member 46 abuts against the projection 23f of the gear member 23, thus returning the memory member 46 to the predetermined position.

Incidentally, it should be noted that the elements in the second embodiment corresponding to those of the first embodiment are designated by the same reference numerals, wherefore detailed explanation thereof is omitted.

We claim:

1. A tilt steering column unit with memory mechanism for vehicles, comprising:

a supporting member (3) for rotatably supporting a steering shaft (2) on which a steering wheel (1) is fixedly mounted;

a fixed member (8) for tiltably supporting said supporting member for rocking movement around tilt pins (17, 18);

a first member (23) fixed to said supporting member and having a first gear portion (23a);

a second member (25) having one end pivotably connected to a pivot shaft (24) fixed to said fixed member and another end provided with a second gear portion (25a) engageable with said first gear portion;

said second member being rockable in one direction around said pivot shaft to release an engagement between said first and second gear portions when a tilt angle between said supporting member and said fixed member is to be altered, and being rockable in an opposite direction to reestablish the engagement between said first and second gear portions after said tilt angle is altered;

a third member (46) mounted on said fixed member for movement in a predetermined direction and having a third gear portion (46a) engageable with said first gear portion;

said third member being movable in said predetermined direction while maintaining a released condition between said first gear portion and said second gear portion, thereby altering an engagement position between said third gear portion and said first gear portion to change a memory position of said supporting member;

control means for preventing said second gear portion from engaging with said first gear portion when said supporting member is lifted upwardly, and for permitting the engagement between said first and second gear portions when said supporting member is pushed down, said control means comprising a first portion (46c) formed on said third member near said third gear portion, and a second portion (25d) formed on said first member near said first gear portion; and shift preventing means for preventing said third member from shifting beyond a certain limit relative to said second member even if said steering wheel is pushed down while said second gear portion is disengaged from said first gear portion an even if said third gear portion is disengaged from said first gear portion, said shaft preventing means comprising a projection (23f) formed on an end of said first gear portion, and an end surface (46g) of said third gear portion of said third member.

2. A tilt steering column unit with memory mechanism for vehicles, comprising:

a steering shaft supporting member (3) tiltably mounted to a fixed member (8), a first member (23) fixed to said steering shaft supporting member for tilting therewith and having a first gear portion (23a), a second member (25) having a second gear portion (25a) and pivotally connected to said fixed member such that said second gear portion may be engaged with said first gear portion to lock said steering shaft supporting member at a set tilt memory angle relative to said fixed member and disengaged from said first gear portion to enable tilting of said steering shaft supporting member relative to said fixed member, and a third member (46) having a third gear portion (46a) and pivotally connected to said fixed member such that said third gear portion may be engaged with said first gear portion to set the tilt memory angle and disengaged from said first gear portion to enable adjustment of the tilt memory angle setting, said third member being movable with said steering shaft supporting member during tilting movement of said steering shaft supporting member with said first and third gear portions engaged, said third member having a memory plate (46c) disposed to come between said first and second gear portions to prevent re-engagement thereof when said steering shaft supporting member is tilted up relative to said fixed member and to move back out from between said first and second gear portions to permit re-engagement thereof when said steering shaft supporting member is tilted back down to the set tilt memory angle.

3. A tilt steering column unit according to claim 2, wherein said second member has a recessed portion (25d) disposed to engage said memory plate when said memory plate moves out from between said first and second gear portions, so that said second member may pivot to re-engage said first and second gear portions.

4. A tilt steering column unit according to claim 3, wherein said recessed portion is disposed adjacent to said second gear portion such that said recessed portion and said memory plate engage just as said memory plate passes clear of an end of said second gear portion.

5. A tilt steering column unit according to claim 3, further comprising forcing means (23b, 46f, 23f, 46g) operable in the event that said third gear portion has been mistakenly disengaged from said first gear portion with said steering shaft supporting member in a tilted-up state, said forcing means acting to force said memory plate back into engagement with said recessed portion when said steering shaft supporting member has been tilted back down to a predetermined tilt angle within the range of tilt memory angle adjustment.

6. A tilt steering column unit according to claim 5, wherein said predetermined tilt angle corresponds to the lowest tilt angle of said range.

7. A tilt steering column unit according to claim 5, wherein said forcing means includes a projection (46f, 23f) formed on one of said first and third members and a cooperable abutment portion (23b, 46g) on the other of said first and third members.

8. A tilt steering column unit with memory mechanism for vehicles, comprising:

a steering shaft supporting member (3) tiltably mounted to a fixed member (8), a first member (23) fixed to said steering shaft supporting member for tilting therewith and having a first gear portion (23a), a second member (25) having a second gear portion (25a) and pivotally connected to said fixed member such that said second gear portion may be engaged with said first gear portion to lock said steering shaft supporting member at a set tilt memory angle relative to said fixed member and disengaged from said first gear portion to enable tilting of said steering shaft supporting member relative to said fixed member, and a third member (46) having a third gear portion (46a) and pivotally connected to said fixed member such that said third gear portion may be engaged with said first gear portion to set the tilt memory angle and disengaged from said first gear portion to enable adjustment of the tilt memory angle setting, said third member being movable with said steering shaft supporting member during tilting movement of said steering shaft supporting member with said first and third gear portions engaged, said third member having a memory member (46c) for preventing re-engagement of said first and second gear portions when said steering shaft supporting member is in a tilted-up state and for permitting re-engagement of said first and second gear portions when said steering shaft supporting member is tilted back down to the set tilt memory angle, and forcing means (23b, 46f, 23f, 46g) operable in the event that said third gear portion has been mistakenly disengaged from said first gear portion with said steering shaft supporting member in a tilted-up state, said forcing means acting to force said memory member to a position in which said first and second gear portions may re-engage when said steering shaft supporting member has been tilted back down to a predetermined tilt angle within the range of tilt memory angle adjustment.

9. A tilt steering column unit according to claim 8, wherein said predetermined tilt angle corresponds to the lowest tilt angle of said range.

10. A tilt steering column unit according to claim 8, wherein said forcing means includes a projection (46f, 23f) formed on one of said first and third members and a cooperable abutment portion (23b, 46g) on the other of said first and third members.

* * * * *